US009566753B2

(12) United States Patent
Nishida

(10) Patent No.: US 9,566,753 B2
(45) Date of Patent: Feb. 14, 2017

(54) WINDING APPARATUS

(75) Inventor: Kihachiro Nishida, Hashima (JP)

(73) Assignee: Fuji Seiko Co., Ltd. and Fuji Shoji Co., Ltd. (JP)

( * ) Notice: Subject to any disclaimer, the term of this patent is extended or adjusted under 35 U.S.C. 154(b) by 139 days.

(21) Appl. No.: 14/405,927

(22) PCT Filed: Jun. 12, 2012

(86) PCT No.: PCT/JP2012/065043
§ 371 (c)(1),
(2), (4) Date: Dec. 5, 2014

(87) PCT Pub. No.: WO2013/186860
PCT Pub. Date: Dec. 19, 2013

(65) Prior Publication Data
US 2015/0151502 A1 Jun. 4, 2015

(51) Int. Cl.
*B29D 30/48* (2006.01)
*B21F 37/00* (2006.01)

(52) U.S. Cl.
CPC ............... *B29D 30/48* (2013.01); *B21F 37/00* (2013.01); *B29D 2030/487* (2013.01)

(58) Field of Classification Search
CPC ........ B21F 37/00; B29D 20/48; B29D 20/485; B29D 20/487; B29D 2030/487
See application file for complete search history.

(56) References Cited

U.S. PATENT DOCUMENTS

| 1,559,127 | A | * | 10/1925 | Perrault | B29D 30/48 15/40 |
| 4,196,036 | A | * | 4/1980 | Allen | B29D 30/48 156/136 |
| 5,228,942 | A | * | 7/1993 | Kokui | B29D 30/48 156/415 |

(Continued)

FOREIGN PATENT DOCUMENTS

| CN | 1154881 A | 7/1997 |
| CN | 201455143 U | 5/2010 |

(Continued)

OTHER PUBLICATIONS

International Search Report for corresponding PCT/JP2012/065043, completed Aug. 17, 2012 by Japanese Patent Office.

(Continued)

*Primary Examiner* — Emmanuel M Marcelo
(74) *Attorney, Agent, or Firm* — Tarolli, Sundheim, Covell & Tummino LLP

(57) ABSTRACT

A winding apparatus winds a wire around the circumference of a circular former and lays out the wire in an arrangement of columns and rows to form a bead ring. A roller for pressing a wire positioned on the circumference of the former is located on an apparatus frame and movable in a direction along the columns of the wire and a direction along the rows of the wire. A circular cam having cam surfaces is supported by a camshaft that rotates in synchronism with rotation of the former. A cam follower is engaged with the cam surfaces of the cam and moved integrally with the roller (Continued)

in the direction along the columns of the wire and the direction along the rows of the wire. Thus, the cam surfaces act to move the roller in the direction along the columns of the wire.

5 Claims, 4 Drawing Sheets

(56) References Cited

U.S. PATENT DOCUMENTS

| | | | |
|---|---|---|---|
| 6,457,667 B1 * | 10/2002 | Golightly | B65H 59/04 242/129.8 |
| 2001/0023737 A1 | 9/2001 | Caretta et al. | |
| 2003/0116254 A1 * | 6/2003 | Sata | B29D 30/48 156/136 |
| 2005/0028918 A1 | 2/2005 | Caretta et al. | |
| 2005/0145320 A1 * | 7/2005 | Niwa | B29D 30/48 156/136 |
| 2012/0064357 A1 | 3/2012 | Kawashima et al. | |

FOREIGN PATENT DOCUMENTS

| | | | |
|---|---|---|---|
| CN | 102449179 A | 5/2012 | |
| CN | 102481741 A | 5/2012 | |
| EP | 0 532 778 A1 | 3/1993 | |
| GB | 920082 A | 3/1963 | |
| JP | 35-18188 B1 | 12/1960 | |
| JP | 6-286022 A | 10/1994 | |
| JP | 2009-12326 A | 1/2009 | |
| JP | 2009-79703 A | 4/2009 | |
| JP | WO 2013145192 A1 * | 10/2013 | ............ B29D 30/48 |
| RU | 2213008 C2 | 9/2003 | |
| SU | 503738 A | 2/1976 | |
| SU | 1381002 A1 | 3/1988 | |

OTHER PUBLICATIONS

Translation of the International Preliminary Report on Patentability for PCT/JP2012/065043, mailed Aug. 28, 2012, pp. 1-5.
Chinese Office Action for Application No. 201280073877.2 dated Oct. 10, 2015.
Office Action to Russian Application No. 2014152049 dated May 25, 2016.

* cited by examiner

WINDING APPARATUS

RELATED APPLICATIONS

The present invention is a U.S. National Stage under 35 USC 371 patent application, claiming priority to Ser. No. PCT/JP2012/065043, filed on 12 Jun. 2012, the entirety of which is incorporated herein by reference.

TECHNICAL FIELD

The present invention relates to a winding apparatus that winds a wire around the circumference of a circular former and lays out the wire in an arrangement of columns and rows to form a bead ring.

BACKGROUND ART

Generally, in this type of winding apparatus, a roller, which restricts the position of the wire to a location corresponding to the circumference of the former, is movable in the axial direction and radial direction of the former, that is, a direction along the columns of the wire and a direction along the rows of the wire. Whenever the former is rotated once and a single winding of the wire is wound around the circumference of the former, the roller is moved one pitch in the direction along the columns of the wire by an actuator.

PRIOR ART DOCUMENT

Patent Document

Patent Document 1: Japanese Laid-Open Patent Publication No. 2009-12326

SUMMARY OF THE INVENTION

Problems that are to be Solved by the Invention

In the winding apparatus of the prior art described above, the roller, which presses the wire, is moved in a direction along the columns of the wire in accordance with the rotation of the actuator. Thus, a complicated control structure is needed to control the rotation of the actuator in synchronism with the rotation of the former. Further, if the actuator is a pulse motor or a servo motor, when synchronism of the motor is lost such as when a momentary power outage results in an inertial situation, subsequent rotation control becomes difficult. This adversely affects the winding of the bead ring.

Accordingly, it is an object of the present invention to provide a winding apparatus that can smoothly perform a wire winding operation and move a roller, which presses a wire positioned on the circumference of a former, in a direction along columns of the wire in synchronism with rotation of the former using a simple mechanical structure.

Means for Solving the Problems

To achieve the above object, the present invention provides a winding apparatus that winds a wire around the circumference of a circular former and lays out the wire in an arrangement of columns and rows to form a bead ring. The winding apparatus includes a roller that is located on an apparatus frame and movable in a direction along the columns and a direction along the rows. The roller presses a wire positioned on the circumference of the former. A circular cam is supported by a camshaft that rotates in synchronism with rotation of the former. The cam includes a plurality of cam surfaces. A cam follower is engaged with the cam surfaces and moved integrally with the roller in the direction along the columns of the wire and the direction along the rows of the wire. The cam surfaces act to move the roller in the direction along the columns of the wire.

In the winding apparatus of the invention, whenever the former rotates once and a single winding of the wire is wound around the circumference of the former, the cam surfaces of the cam, which is rotated a predetermined angle in synchronism with the rotation of the former, acts to move the roller, which presses the wire, one pitch in the direction along the columns of the wire with the cam follower. Thus, the roller can be accurately moved in the direction along the columns of the wire in synchronism with the rotation of the former by a simple mechanical structure formed by the cam and the cam follower. Further, since the roller is moved by the mechanical structure formed by the cam and the cam follower, when a power outage stops the operation of the winding apparatus, the cam follower is held in contact with one of the cam surfaces of the cam at the stopped position. Thus, when recovering from the power outage, the cam surfaces act to continue movement of the roller in the direction along the columns of the wire and allows for the operation of the winding apparatus to be restarted without any problems.

In the above structure, the number of the cam surfaces is preferably set so that a single bead ring is formed as the cam rotates once.

In the above structure, the winding apparatus preferably includes a drive gear that rotates in synchronism with rotation of the former. In this case, the cam is coupled, in a removable manner, to the camshaft. Further, the cam is formed by a disk-shaped main body, which includes the cam surfaces, and a driven gear, which is fixed to the side surface of the main body. The drive gear is engaged, in a separable manner, with the driven gear.

In the above structure, the winding apparatus preferably includes a drive member that moves the cam follower from a winding terminating position on the cam surfaces to a winding initiating position on the cam surfaces when the winding of the wire ends.

In the above structure, the cam surfaces preferably face an axial direction of the former.

Effects of the Invention

As described above, the present invention succeeds in moving the roller, which presses a wire positioned on the circumference of the former, in the direction along the columns of the wire in synchronism with rotation of the former using a simple mechanical structure and avoiding adverse situations.

MODES FOR CARRYING OUT THE INVENTION

A winding apparatus according to one embodiment of the present invention will now be described with reference to FIGS. 1 to 7.

Figure 1:
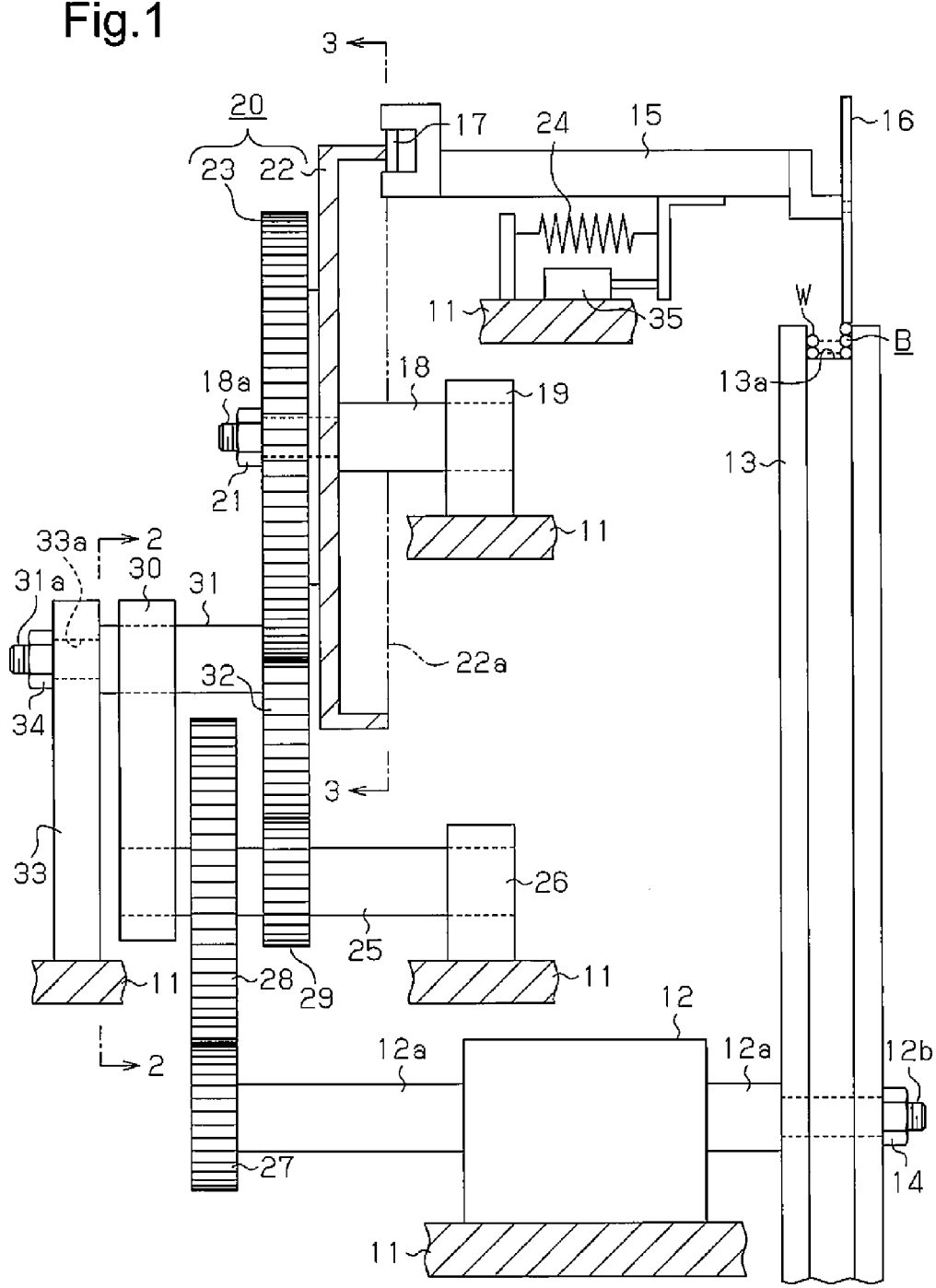
FIG. 1 is a schematic diagram showing a winding apparatus according to one embodiment of the present invention.

As shown in FIG. 1, a motor 12 is located on an apparatus frame 11 of the winding apparatus. The motor 12 includes a motor shaft 12a with an end that defines a threaded portion 12b. A former 13 is coupled, in a removable manner, to the threaded portion 12b by a nut 14. A groove 13a is formed in the circumference of the former 13. The winding apparatus rotates the former 13 in one direction with the motor 12 to wind a wire W around the former 13 in the groove 13a and lay out the wire W in an arrangement of columns and rows to form a bead ring B having the cross-sectional shape shown in FIG. 5.

A support member 15 is supported by the apparatus frame 11 at a location corresponding to the groove 13a of the former 13. The support member 15 is movable in the axial direction and radial direction of the former 13, that is, a direction along the columns of the wire W and a direction along the rows of the wire W. The support member 15 includes an end that rotatably supports a roller 16, which is used to press the wire W into the groove 13a of the former 13. The other end of the support member 15 rotatably supports a cam follower 17, which is formed by a roller that can be engaged with cam surfaces 22a of a cam 20, which will be described later.

Figure 2:
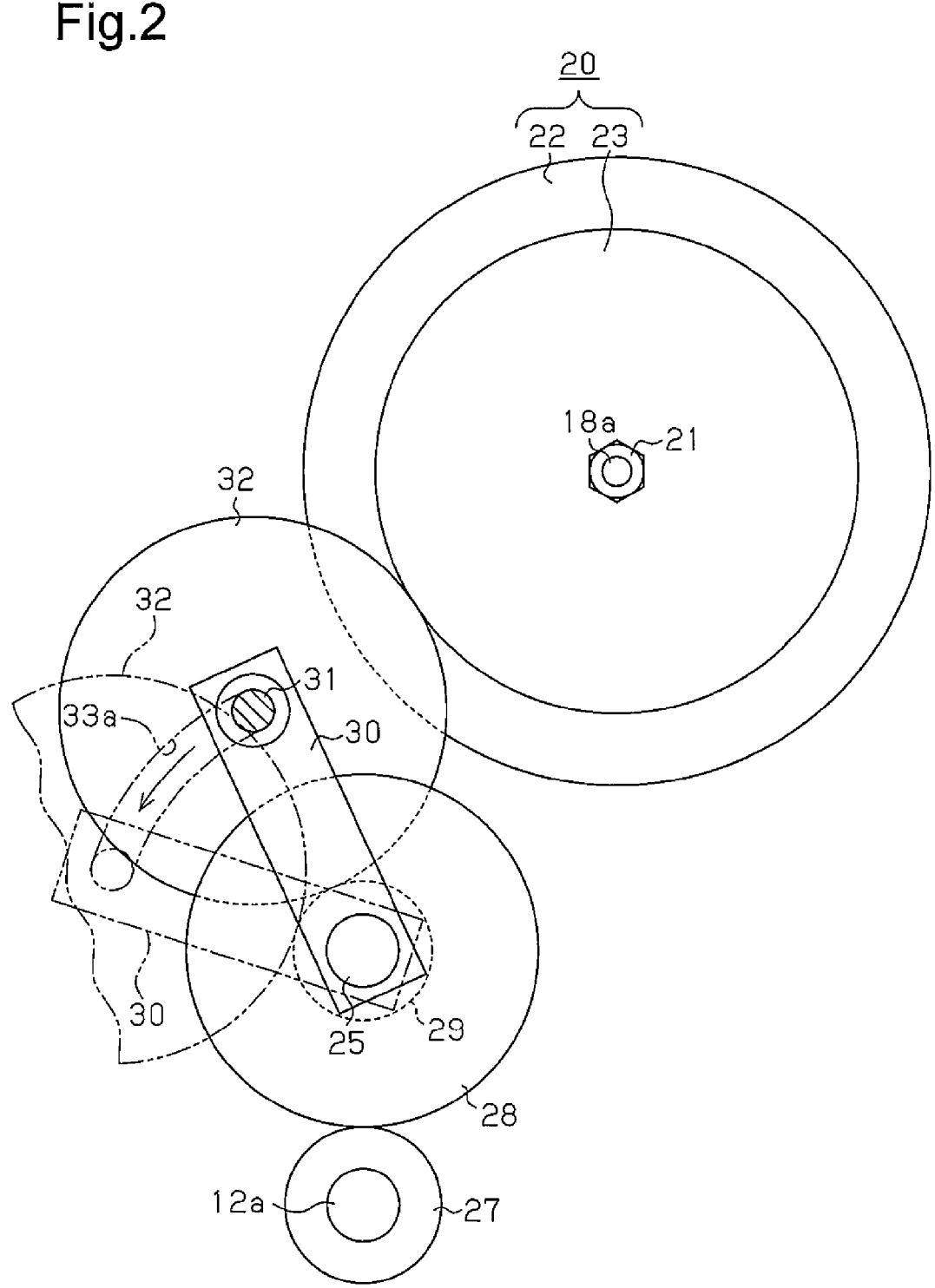
FIG. 2 is a cross-sectional view taken along line 2-2 in FIG. 1.
Figure 3:
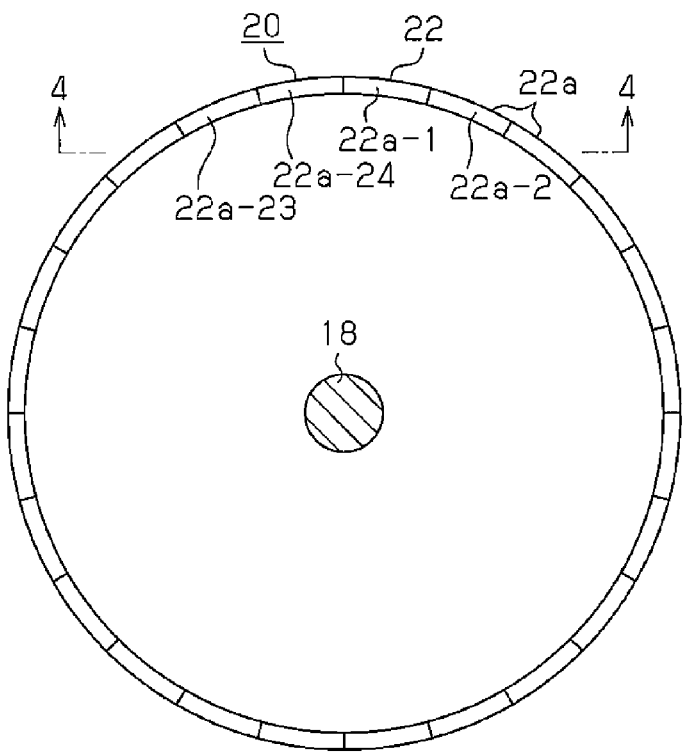
FIG. 3 is a cross-sectional view taken along line 3-3 in FIG. 1.

As shown in FIGS. 1 to 3, the apparatus frame 11 rotatably supports a camshaft 18 with a bearing 19 at a location corresponding to the cam follower 17. The camshaft 18 includes a distal end defining a threaded portion 18a. A cam 20, which has a circular shape in a side view, is coupled, in a removable manner, to the threaded portion 18a by a nut 21. The cam 20 includes a disk-shaped main body 22. A wall, which includes wall portions of different heights, is bent from the rim of the main body 22. The peak surface of each wall portion forms a cam surface 22a that can be engaged with the cam follower 17. The cam surfaces 22a face the axial direction of the former 13, that is, a direction in which the motor shaft 12a extends. A driven gear 23 is fixed to a side surface of the main body 22 that is opposite to the side surface on which the cam surfaces 22a are provided.

A spring 24 is arranged between the apparatus frame 11 and the support member 15 to urge and move the support member 15 in one direction. The urging force of the spring 24 causes the cam follower 17 to engage with the cam surfaces 22a of the cam 20. When the cam 20 rotates, the cam surfaces 22a act to move the roller 16 in the direction along the columns of the wire W.

Figure 4:
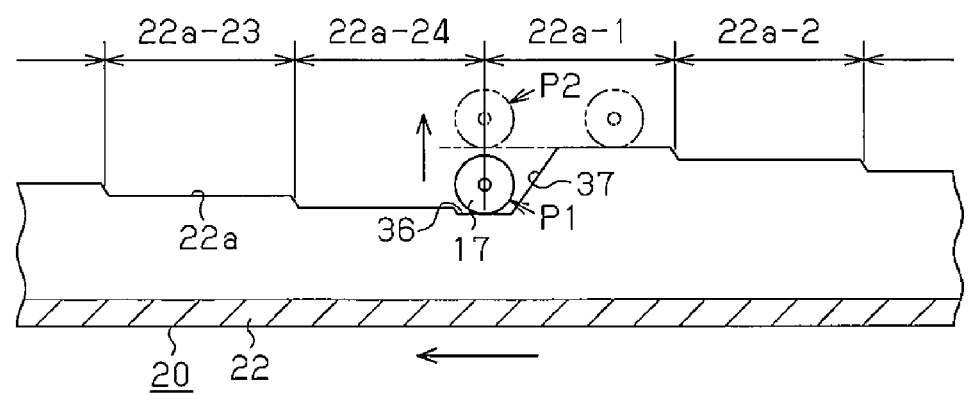
FIG. 4 is an enlarged partial cross-sectional view showing the cross-section taken along line 4-4 in FIG. 3 in a state in which cam surfaces are spread out.
Figure 5:
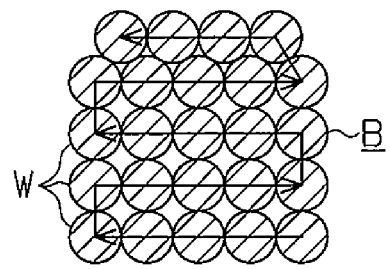
FIG. 5 is an enlarged cross-sectional view of a bead ring formed by the winding apparatus of FIG. 1.

In the present embodiment, the bead ring B is formed by rotating the former 13 and winding the wire W around the former 13 twenty-four times. The cam 20 rotates once as the former 13 rotates twenty-four times. That is, the cam 20 is rotated 15° as the former 13 rotates once. The distance from the cam surface 22a to the main body 22 changes every 15°. In other words, the cam surfaces 22a includes twenty-four portions in which the distance from the main body 22 differs from that of the adjacent portion. Thus, the number of the cam surfaces 22a is set in accordance with the number of windings of the wire W so that a single bead ring B is formed when the cam 20 rotates once. Each cam surface 22a moves the support member 15 with the cam follower 17 in the axial direction of the former 13 in accordance with the distance from the main body 22. As shown in FIG. 4, winding initiating portions 22a-1 and 22a-2 of the cam surfaces 22a are located continuously with the winding terminating portions 22a-23 and 22a-24 of the cam surfaces 22a.

As shown in FIGS. 1 and 2, a transmission shaft 25 is rotatably supported by a bearing 26 on the apparatus frame 11 between the driven gear 23 of the cam 20 and the motor 12. A second transmission gear 28 and a third transmission gear 29, which is rotated integrally with the second transmission gear 28, are fixed onto the transmission shaft 25. A first transmission gear 27 is arranged on an end of the motor shaft 12a that is opposite to the end to which the former 13 is coupled. The second transmission gear 28 is engaged with the first transmission gear 27. The transmission shaft 25 includes a distal end that supports a lever 30 so that the lever 30 is pivotal relative to the transmission shaft 25. The lever 30 has a free end that supports a support shaft 31. The proximal end of the support shaft 31 rotatably supports a drive gear 32 that is constantly engaged with the third transmission gear 29 and engaged in a separable manner with the driven gear 23 of the cam 20. When the drive gear 32 is engaged with the driven gear 23, rotation of the former 13 with the motor 12 rotates the cam 20 in synchronism with the former 13 through the gears 27, 28, 29, 32, and 23. In the present embodiment, the gear ratio of the gears is set so that the cam 20 is rotated 15° as the former rotates once.

As shown in FIGS. 1 and 2, a restriction plate 33 is arranged on the apparatus frame 11 at a location corresponding to the support shaft 31. The restriction plate 33 includes an arcuate guide groove 33a through which the distal portion of the support shaft 31 is inserted. In a situation in which the distal portion of the support shaft 31 is inserted through the guide groove 33a of the restriction plate 33, the lever 30 is pivoted about the transmission shaft 25 to move the drive gear 32 between an engaged position, at which the drive gear 32 is engaged with the driven gear 23 of the cam 20, and a separated position, at which the drive gear 32 is separated from the driven gear 23. The support shaft 31 includes a distal end that defines a threaded portion 31a. A nut 34 may be fastened to the threaded portion 31a and tightened on the restriction plate 33 to disable pivoting of the lever 30, that is, hold the drive gear 32 at the engaged position or the separated position.

As shown in FIG. 1, a cylinder 35, which serves as a drive member, is arranged on the apparatus frame 11 at a location corresponding to the support member 15, which supports the roller 16 and the cam follower 17. When the cam 20 is rotated once and the formation of the bead ring B ends, that is, when the winding of the wire W ends, the cylinder 35 performs a projection operation to move the cam follower 17, which is located on the winding terminating portion 22a-24 of the cam surfaces 22a, from a winding terminating position P1 to a winding initiating position P2.

Figure 6:
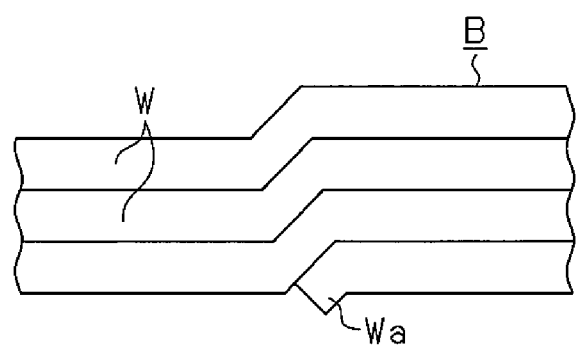
FIG. 6 is a schematic partial plan view showing a winding terminating end of the wire in the bead ring of FIG. 5.

As shown in FIG. 4, the winding terminating portion 22a-24 of the cam surfaces 22a includes a step 36. When the formation of the bead ring B ends, the step 26 acts to arrange the cam follower 17 at the lowest winding terminating position P1. Thus, as shown in FIG. 6, a winding terminating end Wa of the wire W is slightly bent outward to project from the periphery of the bead ring B. A sloped surface 37 is formed on the winding initiating portion 22a-1 of the cam surfaces 22a adjacent to the winding terminating portion 22a-24 so as not to interfere with the movement of the cam follower 17 from the winding terminating position P1 to the winding initiating position P2.

The operation of the winding apparatus will now be described.

In the situation shown in FIGS. 1 and 2, the lever 30 is located at a position where the drive gear 32 is engaged with the driven gear 23 of the cam 20. Under this situation, the rotation of the motor 12 rotates the former 13 in one direction. This winds the wire W around the circumference of the former 13 in the groove 13a as the roller 16 presses the wire W. Further, the rotation of the motor 12 rotates the cam 20 in synchronism with the former 13 in the direction of the arrow in FIG. 4 through the gears 27, 28, 29, 32, and 23. As a result, the support member 15 and the roller 16 move in the axial direction of the former 13, while the cam follower 17 is contacting and engaging the cam surfaces 22a of the cam 20. Accordingly, whenever the former 13 rotates once and winds a single winding of the wire W around the circumference of the former 13 in the groove 13a, the cam surfaces 22a act to move the roller 16 one pitch in the direction along the columns of the wire W. When the number of the columns of the wire W, which is wound around the former 13 in this manner, reaches a predetermined number, a moving means (not shown) moves the roller 16 one pitch in the direction along the rows of the wire W with the support member 15. These operations are repeated to lay out the wire W in the groove 13a of the former 13 in an arrangement of columns and rows and in the order shown by the arrow in FIG. 5. This forms the bead ring B.

When the formation of the bead ring B ends, as shown in FIG. 4, the cam follower 17 is located at the winding terminating position P1 and engaged with the step 36 in the winding terminating portion 22a-24 of the cam surfaces 22a. Consequently, as shown in FIG. 6, the winding terminating end Wa of the wire W is slightly bent outward to project from the periphery of the bead ring B.

Subsequently, the cylinder 35 performs a projection operation to move the cam follower 17, which is located on the winding terminating portion 22a-24 of the cam surfaces 22a, from the winding terminating position P1 to the winding initiating position P2 without using the cam surfaces 22a. This prepares for the formation of the next bead ring B.

A mark (not shown), which indicates the origin point of the rotational position, is provided on the circumferential surface of the cam 20. When the cam follower 17 reaches a terminal end of the winding terminating portion 22a-24 in the cam surfaces 22a, a sensor (not shown) detects the mark and suspends rotation of the cam 20 and the former 13. The bead ring B formed on the former 13 is removed from the winding apparatus during the suspension.

When a power outage stops the motor 12 during the formation of the bead ring B, the former 13 and the cam 20 stop rotating. In this case, the cam follower 17 is held contacting and engaging one of the cam surfaces 22a of the cam 20 at the stopped position. Thus, when recovering from the power outage, the cam 20 is rotated again and the cam surfaces 22a act to continue movement of the roller 16 in the direction along the columns of the wire W without any problems.

When changing the cross-sectional shape or winding diameter of the bead ring B to be formed on the former 13, the former 13 on the motor shaft 12a of the motor 12 is replaced with another former 13 that has a different cross-sectional shape or a groove 13a with a different diameter. Further, the nut 34, which is fastened to the threaded portion 31a on the distal end of the support shaft 31, is loosened to move the lever 30 to a position where the drive gear 32 is separated from the driven gear 23 of the cam 20, as shown by the double-dotted chain lines in FIG. 2. This enables the cam 20 on the camshaft 18 to be replaced with another cam 20 that has a different gear ratio. After coupling the new cam 20 to the camshaft 18, the lever 30 is moved until the drive gear 32 engages with the driven gear 23 of the new cam 20. Then, the nut 34 is tightened to the restriction plate 33. In this manner, the cam 20 may easily be changed in accordance with the bead ring B that is to be formed.

Accordingly, the present embodiment has the advantages described below.

(1) The winding apparatus forms the bead ring B by winding a wire W around the circumference of the circular former 13 to lay out the wire W in an arrangement of columns and rows. The apparatus frame 11 is provided with the roller 16, which is movable in the direction along the columns of the wire W and the direction along the rows of the wire W to press the wire W positioned on the circumference of the former 13. The circular cam 20 that includes the cam surfaces 22a is supported by the camshaft 18, which is rotated in synchronism with the rotation of the former 13. The cam follower 17, which moves integrally with the roller 16 in the direction along the columns and the direction along the rows, is engaged with the cam surfaces 22a of the cam 20. Consequently, the cam surfaces 22a act to move the roller 16 in the direction along the columns of the wire W.

Thus, in the winding apparatus, whenever the former 13 rotates once and a single winding of the wire W is wound around the circumference of the former 13, the cam surfaces 22a of the cam 20, which is rotated a predetermined angle in synchronism with the rotation of the former 13, acts to move the roller 16 one pitch in the direction along the columns of the wire W. Thus, the roller 16 can be accurately moved in the direction along the columns of the wire W in synchronism with the rotation of the former 13 by a simple mechanical structure formed by the cam 20 and the cam follower 17. Further, since the roller 16 is moved by the mechanical structure formed by the cam 20 and the cam follower 17, when a power outage stops the operation of the winding apparatus, the cam follower 17 is held in contact with one of the cam surfaces 22a of the cam 20 at the stopped position. Thus, when recovering from the power outage, the cam surfaces 22a act to continue movement of the roller 16 in the direction along the columns of the wire W and allows for the operation of the winding apparatus to be restarted without any problems.

(2) In the winding apparatus, the number of the cam surfaces 22a is set so that a single bead ring B is formed as the cam 20 rotates once. Thus, the cam surfaces 22a on the cam 20 act to sequentially move the roller 16 one pitch in the direction along the columns of the wire W whenever the cam 20 rotates once so that a single bead ring B can be formed.

(3) The winding apparatus includes the drive gear 32 that rotates in synchronism with the rotation of the former 13. The cam 20 is coupled, in a removable manner, to the camshaft 18. Further, the cam 20 is formed by the disk-shaped main body 22, which includes the cam surfaces 22a, and the driven gear 23, which is fixed to the side surface of the main body 22. The drive gear 32 is engaged, in a separable manner, with the driven gear 23. Thus, when there is a need to replace the cam 20, such as when changing the cross-sectional shape or winding diameter of the bead ring B to be formed on the former 13, the cam 20 is easily removed from the camshaft 18 by separating the drive gear 32 from the driven gear 23 of the cam 20.

(4) The winding apparatus includes the cylinder 35, which serves as a drive member that moves the cam follower 17 from the winding terminating position P1 on the cam surfaces 22a to the winding initiating position P2 on the cam surfaces 22a when the winding of the wire W ends. Thus, when the winding of the wire W ends, the cylinder 35 can readily move the cam follower 17 from the winding terminating position P1 to the winding initiating position P2 without using the cam surfaces 22a and prepare for the formation of the next bead ring B.

(5) In the winding apparatus, the cam surfaces 22a face the axial direction of the former 13. Thus, the cam surfaces 22a move the roller 16 in the same direction as the direction along the columns of the bead ring B. This eliminates the need for a motion conversion mechanism between the cam surfaces 22a and the roller 16 and simplifies the structure.

MODIFIED EXAMPLES

The above embodiment may be modified as described below.

The shape of the main body 22 of the cam 20 and the location where the cam surfaces 22a are formed may be changed. For example, in the above embodiment, the cam surfaces 22a are formed on the cam 20 to face the axial direction of the former 13. However, the cam surfaces 22a may be formed on the circumferential surface of the cam 20. In this case, it is preferred that the camshaft 18 of the cam 20 extend in the vertical direction as viewed in FIG. 1.

The motor 12 may be a geared motor that is able to reduce the rotation speed of the motor shaft. In this case, the two ends on the motor shaft of the geared motor are projected out of a motor housing. One end of the motor shaft supports the former 13, and the other end supports the cam 20.

DESCRIPTION OF THE REFERENCE CHARACTERS

11: apparatus frame, 12: motor, 13: former, 15: support member, 16: roller, 17: cam follower, 18: camshaft, 20: cam, 22: main body, 22a: cam surfaces, 23: driven gear, 27, 28, 29: transmission gears, 30: lever, 32: drive gear, 35: cylinder serving as drive member, W: wire, B: bead ring, P1: winding terminating position, P2: winding initiating position.

I claim:

1. A winding apparatus that winds a wire around the circumference of a circular former and lays out the wire in an arrangement of columns and rows to form a bead ring, the winding apparatus comprising:
    a roller that is located on an apparatus frame and movable in a direction along the columns and a direction along the rows, wherein the roller presses the wire positioned on the circumference of the former;
    a circular cam supported by a camshaft that rotates in synchronism with rotation of the former, wherein the cam includes a plurality of cam surfaces; and
    a cam follower engaged with the cam surfaces and moved integrally with the roller in the direction along the columns and the direction along the rows, wherein the cam surfaces act to move the roller in the direction along the columns.

2. The winding apparatus according to claim 1, wherein the number of the cam surfaces is set so that a single bead ring is formed as the cam fully rotates once.

3. The winding apparatus according to claim 1, wherein:
    the cam is coupled, in a removable manner, to the camshaft; and
    the cam is formed by a disk-shaped main body, which includes the cam surfaces, and a driven gear, which is fixed to a side surface of the main body, the winding apparatus further comprising a drive gear that is engaged, in a separable manner, with the driven gear, wherein the drive gear rotates in synchronism with rotation of the former.

4. The winding apparatus according to claim 1, further comprising a drive member that moves the cam follower from a winding terminating position on the cam surfaces to a winding initiating position on the cam surfaces when the winding of the wire ends.

5. The winding apparatus according to claim 1, wherein the cam surfaces face an axial direction of the former.

* * * * *